(12) United States Patent
Ishikawa et al.

(10) Patent No.: US 7,541,708 B2
(45) Date of Patent: Jun. 2, 2009

(54) SPINDLE MOTOR

(75) Inventors: Katsuo Ishikawa, Ozu (JP); Tsutomu Hamada, Hirakata (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/315,310

(22) Filed: Dec. 23, 2005

(65) Prior Publication Data
US 2006/0158060 A1 Jul. 20, 2006

(30) Foreign Application Priority Data
Dec. 27, 2004 (JP) .............................. 2004-375159

(51) Int. Cl.
*H02K 7/08* (2006.01)
(52) U.S. Cl. ........................................ 310/90; 310/216
(58) Field of Classification Search .................. 310/90, 310/216, 217
See application file for complete search history.

(56) References Cited

U.S. PATENT DOCUMENTS

| | | | | |
|---|---|---|---|---|
| 4,552,417 A | * | 11/1985 | Yamashita et al. | 310/90.5 |
| 4,818,907 A | * | 4/1989 | Shirotori | 310/67 R |
| 4,824,122 A | * | 4/1989 | Raj et al. | 277/410 |
| 5,653,541 A | * | 8/1997 | Ishizuka et al. | 384/478 |
| 5,746,516 A | * | 5/1998 | Miyasaka et al. | 384/291 |
| 5,998,898 A | * | 12/1999 | Fukutani et al. | 310/90 |

FOREIGN PATENT DOCUMENTS

| | | |
|---|---|---|
| JP | 2002-354742 | 12/2002 |
| JP | 2004-248337 | 9/2004 |

* cited by examiner

*Primary Examiner*—Dang D Le
(74) *Attorney, Agent, or Firm*—Steptoe & Johnson LLP

(57) ABSTRACT

A spindle motor including a rotor hub which is rotationally driven by a magnetic action of a rotational magnetic field generated when a current is applied to a wire wound around teeth of a stator core and a magnetic field of a magnet provided on a rotor. Herein, the stator core formed by laminating magnetic steel plates is mounted to an outer periphery of a supporting part of a rotation support shaft of the rotor hub, and the supporting part is made of sintered metal containing a ferromagnetic material. This spindle motor can suppress generation of vibration and noise even when it is reduced in size.

5 Claims, 7 Drawing Sheets

F I G. 1A
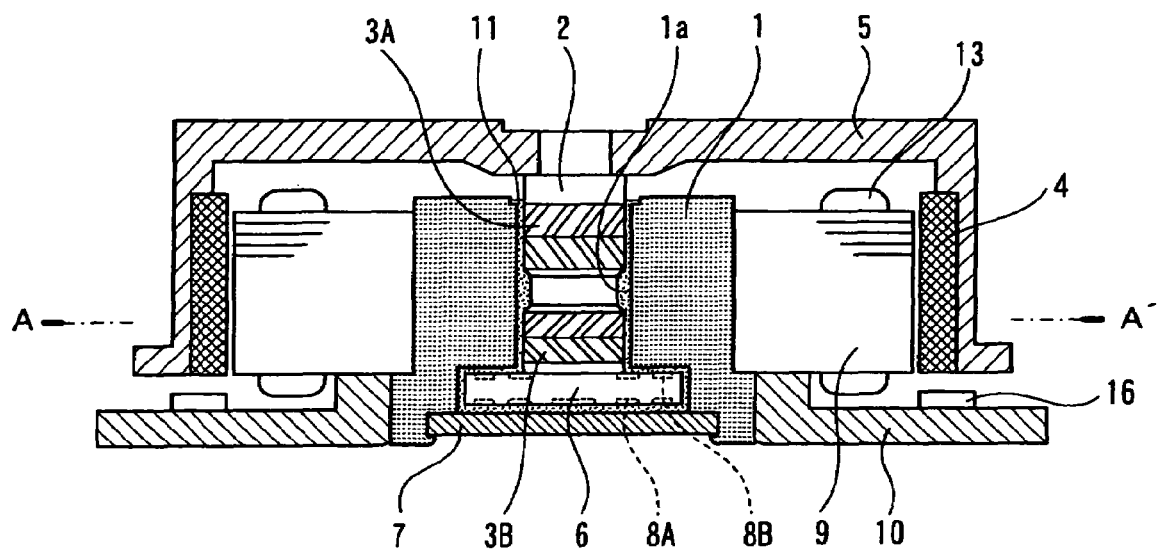
F I G. 1B
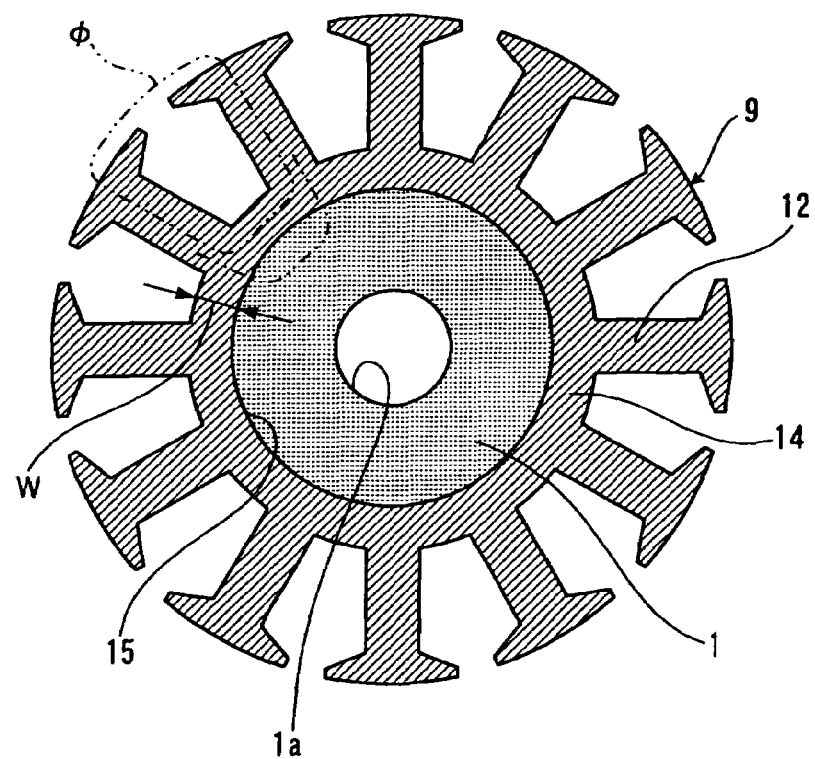

SPINDLE MOTOR

The present application claims priority to Japanese Patent Application No. 2004- 375159, filed Dec. 27, 2004.

FIELD OF THE INVENTION

The present invention relates to a spindle motor for rotationally driving a recording medium such as a magnetic disc or an optical disc.

BACKGROUND OF THE INVENTION

As a spindle motor of this type, there have been known spindle motors disclosed in JP-A 2004-248337, JP-A 2002-354742, and the like.

In recent years, there have been successively developed AV products and home electric products each of which includes a hard disc drive. A use form of such products tends to be changed from a stationary type to a portable type. From a request of portability, there has been required a small-sized, thin spindle motor. In addition, from a request of cost reduction, there has been also required reduction in the number of components.

Particularly, in a spindle motor used in a hard disc drive, a hydrodynamic bearing is adopted as a bearing for the purpose of achieving high accuracy, silent performance, and extended service life of the spindle motor.

Hereinafter, description will be given of a structure and operation of a conventional spindle motor (see JP-A 2002-354742).

As illustrated in FIG. 7, a conventional spindle motor includes a shaft 20, a flange 21, a sleeve 22, a thrust plate 23, an adhesive 24, a rotor hub 25, a magnet 26, a stator core 27, a coil 28, a base internal cylindrical part 29, an attraction plate 30, and a base member 31.

First, the flange 21 is fixed to the shaft 20 by means of laser welding or the like. Next, the shaft 20 is inserted into and fitted to the sleeve 22. Thereafter, the thrust plate 23 is brought into contact with the flange 21, and a tip end 32 of the sleeve 22 is fixed to the thrust plate 23 by means of caulking or the like. Further, the thrust plate 23 is sealed with the adhesive 24. Thus, a bearing unit is assembled. Then, the bearing unit is filled with lubricating fluid (not illustrated), so that a hydrodynamic bearing is obtained. The rotor hub 25 to which the magnet 26 is fixedly bonded by an adhesive or the like is fixed to the bearing unit assembled as described above; thus, a rotor unit is obtained.

On the other hand, the attraction plate 30 is fixedly bonded to the base member 31 by an adhesive or the like. The stator core 27 having the coil 28 wound therearound is fixedly bonded to the base internal cylindrical part 29; thus, a stator unit is obtained. Finally, the rotor unit is fitted to the stator unit and, then, they are fixedly bonded to each other by an adhesive or the like. In the spindle motor configured as described above, when a current is applied to the coil 28 such that a rotational magnetic field is generated at an outer periphery of the stator core 27, the rotor unit starts to rotating. Then, a radial bearing is formed by dynamic pressure generating grooves cut on an outer periphery of the shaft 20 or an inner circumference of the sleeve 22, a thrust main bearing is formed by dynamic pressure generating grooves cut on a lower face of the flange 21 or an upper face of the thrust plate 23, and a thrust sub bearing is formed by dynamic pressure generating grooves cut on an upper face of the flange 21 or a lower face of the sleeve 22. Thus, the rotor unit rotates with respect to the stator unit in a non-contact manner. The magnet 26 generates an attraction force in relation to the attraction plate 30; therefore, a displacement of the rotor unit in an axial direction is not largely changed by a posture of the spindle motor.

JP-A 2004-248337 discloses a spindle motor wherein a stator core is directly fitted to a sleeve for the purpose of downsizing.

However, even when the size of the spindle motor having the aforementioned conventional configuration is simply reduced, a required torque cannot be attained. In addition, a dimension of the magnet is made relatively large and the number of windings of the coil is increased. Consequently, magnetic saturation occurs in the stator core, a torque waveform is distorted, and vibration and noise are generated. As a result, it is impossible to sufficiently reduce the size of the spindle motor under present circumstances.

SUMMARY OF THE INVENTION

It is an object of the present invention to provide a spindle motor which can suppress generation of vibration and noise even when a size thereof is reduced. Further, the number of assembling processes can be reduced, achieving low cost manufacturing.

According to a first aspect of the present invention, a spindle motor is comprised of a stator including a stator core having teeth, and a rotor including a rotation support shaft, a rotor hub and a magnet, the rotor being rotationally driven by a magnetic action of a rotational magnetic field occurring when a current is applied to a wire wound around the teeth of the stator core and a magnetic field of the magnet of the rotor, wherein the stator core formed by laminating magnetic steel plates is mounted to an outer periphery of a supporting part (a portion corresponding to a sleeve) of the rotation support shaft of the rotor, and the supporting part of the rotation support shaft is made of sintered metal containing a ferromagnetic material.

According to this configuration, the supporting part (a portion corresponding to a sleeve) of the rotation support shaft of the rotor is made of sintered metal containing a ferromagnetic material. Therefore, even when a size of the stator core is reduced so that a width of a teeth yoke for connecting base ends of the teeth becomes narrower, magnet flux of the teeth effectively passes through the supporting part made of sintered metal containing a ferromagnetic material. Thus, it is possible to decrease magnetic saturation in the stator core and to suppress generation of vibration and noise with reliability.

According to a second aspect of the present invention, a spindle motor is comprised of a stator including a stator core having teeth, and a rotor including a rotation support shaft, a rotor hub and a magnet, the rotor being rotationally driven by a magnetic action of a rotational magnetic field occurring when a current is applied to a wire wound around the teeth of the stator core and a magnetic field of the magnet of the rotor, wherein a supporting part of the rotation support shaft of the rotor, and the teeth formed on an outer periphery of the supporting part and wound therearound with the wire are integrally formed using sintered metal containing a ferromagnetic material. According to this configuration, it is possible to further decrease magnetic saturation in the stator core and to suppress generation of vibration and noise with reliability.

According to a third aspect of the present invention, a spindle motor is comprised of a stator including a stator core having teeth, and a rotor including a rotation support shaft, a rotor hub and a magnet, the rotor being rotationally driven by a magnetic action of a rotational magnetic field occurring when a current is applied to a wire wound around the teeth of the stator core and a magnetic field of the magnet of the rotor, wherein a supporting part of the rotation support shaft and the stator core are respectively made of sintered metal containing a ferromagnetic material, and the stator core is mounted to an outer periphery of the supporting part. According to this configuration, even when the spindle motor is reduced in size, productivity thereof is good.

According to a fourth aspect of the present invention, a spindle motor is comprised of a stator including a stator core having teeth, and a rotor including a rotation support shaft, a rotor hub and a magnet, the rotor being rotationally driven by a magnetic action of a rotational magnetic field occurring when a current is applied to a wire wound around the teeth of the stator core and a magnetic field of the magnet of the rotor, wherein a supporting part of the rotation support shaft, and an attraction part formed on a base end part of the supporting part and extending in the vicinity of the magnet so that the magnet receives an attraction force therefrom, are integrally formed using sintered metal containing a ferromagnetic material, and the stator core formed by laminating magnetic steel plates is mounted to an outer periphery of the supporting part of the rotation support shaft. According to this configuration, it is possible to further reduce the number of components.

According to a fifth aspect of the present invention, a spindle motor is comprised of a stator including a stator core having teeth, and a rotor including a rotation support shaft, a rotor hub and a magnet, the rotor being rotationally driven by a magnetic action of a rotational magnetic field occurring when a current is applied to a wire wound around the teeth of the stator core and a magnetic field of the magnet of the rotor, wherein a supporting part of the rotation support shaft, the teeth formed on an outer periphery of the supporting part and wound therearound with the wire, and an attraction part formed on a base end part of the supporting part and extending in the vicinity of the magnet so that the magnet receives an attraction force therefrom, are integrally formed using sintered metal containing a ferromagnetic material. According to this configuration, it is possible to further reduce the number of components.

According to a sixth aspect of the present invention, a spindle motor is comprised of a stator including a stator core having teeth, and a rotor including a rotation support shaft, a rotor hub and a magnet, the rotor being rotationally driven by a magnetic action of a rotational magnetic field occurring when a current is applied to a wire wound around the teeth of the stator core and a magnetic field of the magnet of the rotor, wherein a supporting part of the rotation support shaft, and an attraction part formed on a base end part of the supporting part and extending in the vicinity of the magnet so that the magnet receives an attraction force therefrom, are integrally formed using sintered metal containing a ferromagnetic material, and the stator core made of sintered metal containing a ferromagnetic material is mounted to an outer periphery of the supporting part of the rotation support shaft. According to this configuration, it is possible to reduce the number of components, to improve productivity of a spindle motor when a size thereof is reduced, to decrease magnetic saturation in a stator core, and the like.

According to a seventh aspect of the present invention, in the spindle motor according to any one of the first to sixth aspects, the ferromagnetic material contained in the sintered metal includes at least one of iron, nickel, cobalt, and an alloy thereof.

According to an eighth aspect of the present invention, in the spindle motor according to any one of the first to sixth aspects, the supporting part of the rotation support shaft made of the sintered metal is subjected to pore sealing treatment by being impregnated with resin, in at least a portion thereof which may come into contact with operating fluid.

According to a ninth aspect of the present invention, in the spindle motor according to any one of the first to sixth aspects, the supporting part of the rotation support shaft made of the sintered metal is subjected to pore sealing treatment by being impregnated with resin and further to plating treatment, in at least a portion thereof which may come into contact with operating fluid.

BRIEF DESCRIPTION OF THE DRAWINGS

FIG. 1A is a sectional view of a spindle motor according to a first embodiment of the present invention;

FIG. 1B is a sectional view of a main portion of the spindle motor, taken along line A-A' of FIG. 1A;

DESCRIPTION OF PREFERRED EMBODIMENTS

Figure 2A:
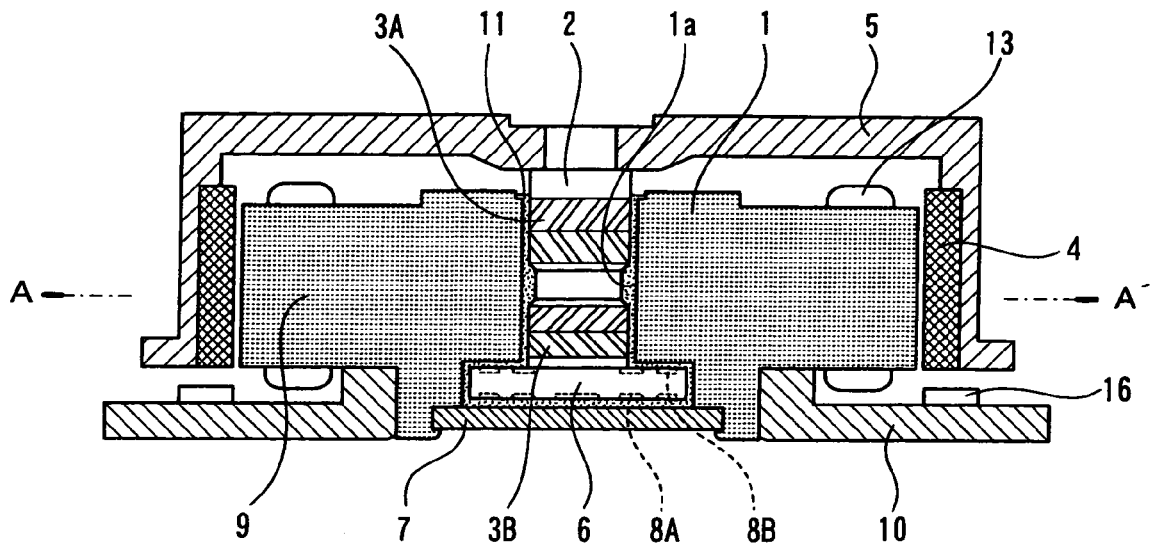
FIG. 2A is a sectional view of a spindle motor according to a second embodiment of the present invention.

Hereinafter, description will be given of embodiments of the present invention with reference to the drawings.

First Embodiment

Figs. 1A and 1B illustrate a first embodiment of the present invention.

It is to be noted that FIG. 1B illustrates a state where a wire 13 is not wound around teeth 12.

As illustrated in FIG. 1A, a shaft 2 is rotatably inserted into a bearing hole 1a of a sleeve 1. A radial bearing face having dynamic pressure generating grooves 3A and 3B formed as patterned shallow grooves is provided on at least one of an outer peripheral face of the shaft 2 and an inner circumferential face of the sleeve 1. A rotor hub 5 having a magnet 4 at an inner circumference of its thick-diameter portion is attached to an upper portion of the shaft 2. A thrust flange 6 is integrally attached to the other end (a lower portion in FIG. 1A) of the shaft 2 so as to be perpendicular to the shaft 2.

A bearing face on a lower end side of the thrust flange 6 opposes a thrust plate 7, and the thrust plate 7 is fixed to the sleeve 1. Spiral-shaped or herringbone-patterned dynamic pressure generating grooves 8A are cut on at least one of the faces of the thrust flange 6 and the thrust plate 7. Herein, the faces of the thrust flange 6 and the thrust plate 7 oppose each other. Dynamic pressure generating grooves 8B are formed on at least one of faces of an upper flat face portion of the thrust flange 6 and the sleeve 1. Herein, the faces of the upper flat face portion of the thrust flange 6 and the sleeve 1 oppose each other. A base end of the sleeve 1 is fixed to a base 10. In this embodiment, the base 10 is formed by aluminum die-casting. An attraction part 16 is fixedly bonded to the base 10.

A stator core 9 formed by laminating magnetic steel plates is finished to have a shape that base ends of teeth 12 having a wire 13 wound therearound are coupled to one another by a yoke 14 (see FIG. 1B). This stator core 9 is press-fitted or adhered to an outer peripheral face of the sleeve 1. An inner circumferential face 15 of the yoke 14 of the stator core 9 is in direct contact with the outer peripheral face of the sleeve 1 without clearance.

Further, a clearance between the shaft 2 and the sleeve 1 and a clearance between the thrust flange 6 and the thrust plate 7 are filled with oil 11 serving as operating fluid.

Herein, the sleeve 1 is made of sintered metal containing a ferromagnetic material. Specific examples of the ferromagnetic material include iron, nickel, cobalt and the like and an alloy thereof. In the case of using sintered metal containing iron, a raw material powder of almost 100% pure iron is evenly mixed, press-molded, and sintered. Further, the resultant is subjected to pore sealing treatment. In the pore sealing treatment, the resultant is impregnated with resin and, if necessary, is coated with plating after impregnation with resin. In addition, dynamic pressure generating grooves are cut on the bearing hole 1a or the like by means of ball rolling or the like. Herein, a portion in the vicinity of the teeth 12 of the stator core 9 is subjected to insulating treatment and, then, the wire 13 is wound around the teeth 12 of the stator core 9.

Herein, the pore sealing treatment refers to treatment in which pores are closed to prevent the following factor. That is, operating fluid oozes from minute voids remaining after sintering of the sintered metal, so that a fluid amount and a fluid pressure decrease.

A conventional sleeve 4 disclosed in JP-A 2004-248337 is made of stainless steel and is manufactured by cutting processing. As compared with such a sleeve 4, the sleeve made of sintered metal containing a raw material powder of 100% pure metal has the following excellent magnetic characteristics. That is, magnetic resistance is low, magnetic saturation is also low, and magnetic flux favorably passes therethrough.

This spindle motor operates as follows.

First, when a current is applied to the wire 13, a rotational magnetic field is generated from the stator core 9. Then, the rotor hub 5 and the shaft 2 are rotationally driven by a magnetic action of the rotational magnetic field of the stator core 9 and a magnetic field of the magnet 4 on the rotor side. Herein, the rotor hub 5 rotates at an appropriate position where a biasing force by attraction of the magnet 4 toward the attraction part 16 serving as an attraction part having an outer periphery extending to a portion in the vicinity of the magnet 4 is proportional to a floating force by the thrust flange 6.

When the rotor hub 5 and the shaft 2 start rotating, a pumping pressure is generated in the oil 11 by the dynamic pressure generating grooves 3A, 3B, 8A and 8B, and a pressure in bearing parts (a radial bearing part and a thrust bearing part) becomes high. Thus, the shaft 2 and the thrust flange 6 float with respect to the sleeve 1 and the thrust plate 7, and rotate with high accuracy in a non-contact manner. More specifically, a radial bearing which rotatably supports in a state of having a predetermined clearance in a radial direction is formed at a portion of the dynamic pressure generating grooves 3A and 3B, and a thrust bearing which rotatably supports in a state of having a predetermined clearance in a thrust direction is formed at a portion of the dynamic pressure generating grooves 8A and 8B.

Although not illustrated in the drawings, one or plural disc(s) as a magnetic recording medium can be fixed to the rotor hub 5. The rotor hub 5 rotates together with the disc(s) to record/reproduce an electric signal.

In this configuration, even when the size of the spindle motor is reduced and a width W of the yoke 14 becomes narrower, magnetic flux $\phi$ passes through not only the yoke 14 but also the sleeve 1 made of sintered metal containing a ferromagnetic material, as shown by an imaginary line in FIG. 1B. It is therefore possible to prevent magnetic resistance from increasing.

Accordingly, it is possible to decrease the magnetic saturation in the stator core 9 and to suppress generation of vibration and noise with reliability.

Second Embodiment

Figure 2B:
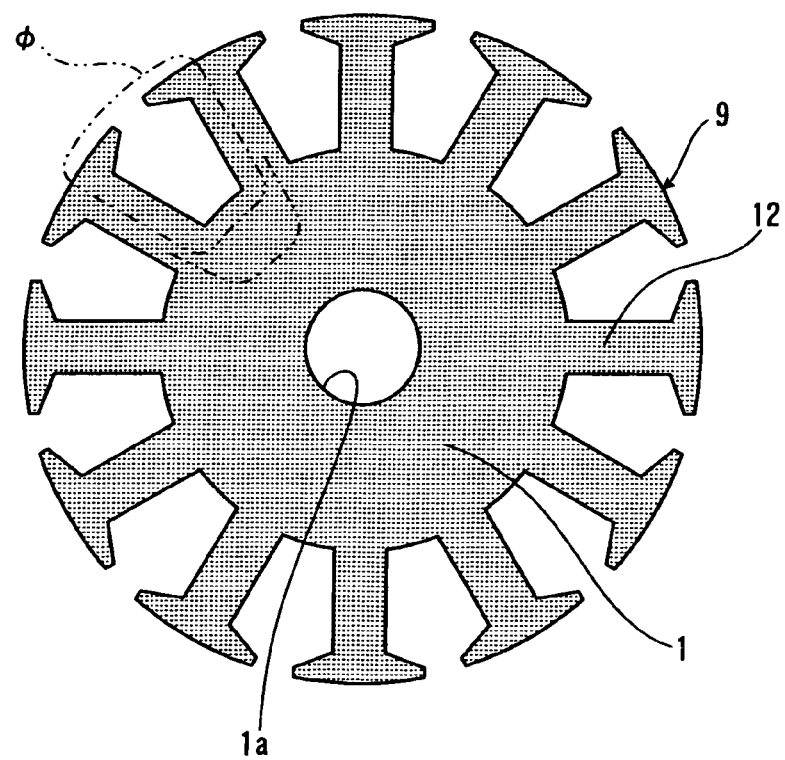
FIG. 2B is a sectional view of a main portion of the spindle motor, taken along line A-A' of FIG. 2A.

FIGS. 2A and 2B illustrate a second embodiment of the present invention.

In the first embodiment illustrated in FIGS. 1A and 1B, the stator core 9 is formed by laminating magnetic steel plates, and the sleeve 1 is made of sintered metal containing a ferromagnetic material. In the second embodiment illustrated in FIGS. 2A and 2B, the stator core 9 is also made of sintered metal containing a ferromagnetic material and is integrally formed with the sleeve 1. The second embodiment is different from the first embodiment in only this point.

According to this configuration, magnetic flux $\phi$ which has passed through the teeth 12 of the stator core 9 passes through the sleeve 1 made of sintered metal containing a ferromagnetic material; therefore, it is possible to prevent magnetic resistance from increasing. Accordingly, it is possible to decrease magnetic saturation in the stator core 9 and to suppress generation of vibration and noise with reliability.

Third Embodiment

Figure 3A:
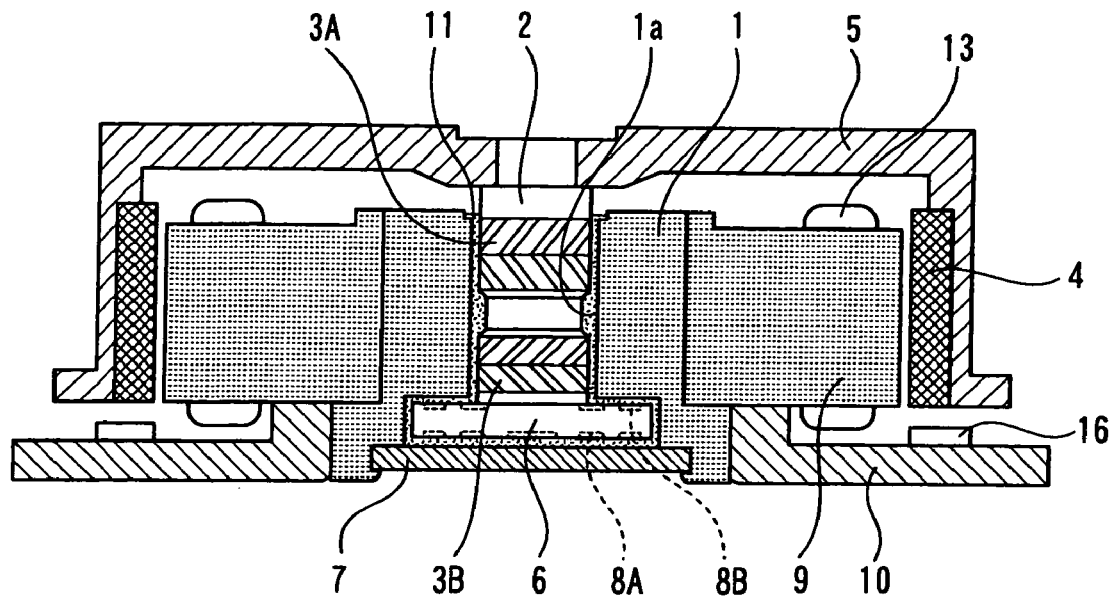
FIG. 3A is a sectional view of a spindle motor according to a third embodiment of the present invention.
Figure 3B:
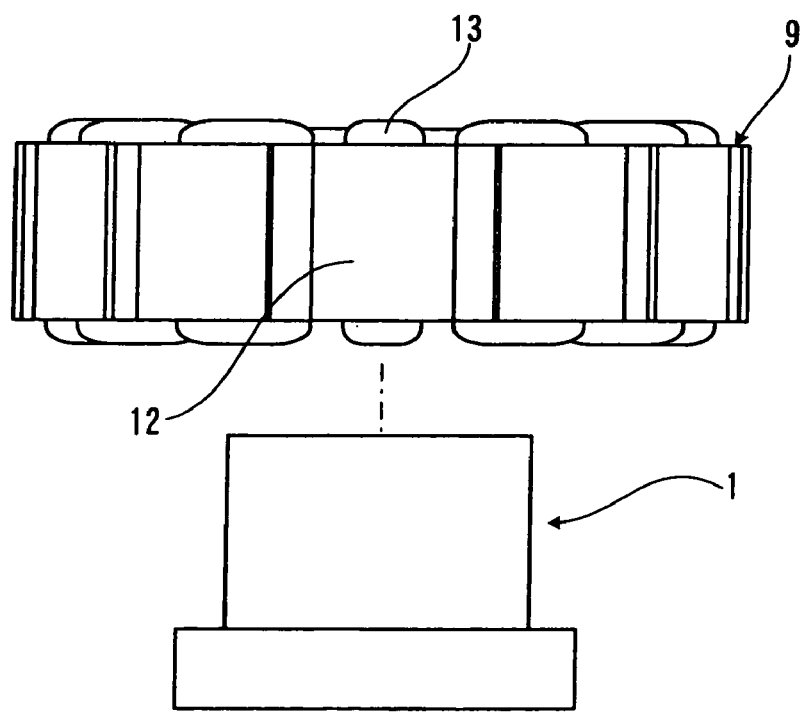
FIG. 3B is an assembly view of a main portion of the spindle motor.

FIGS. 3A and 3B illustrate a third embodiment of the present invention.

In the second embodiment illustrated in FIGS. 2A and 2B, the sleeve 1 and the stator core 9 are integrally formed with each other using sintered metal containing a ferromagnetic material. In the third embodiment, as illustrated in FIG. 3A, the sleeve 1 and the stator core 9 are separately provided, and are respectively made of sintered metal containing a ferromagnetic material.

According to this configuration, the wire 13 is wound around the stator core 9 made of sintered metal containing a ferromagnetic material and, then, the stator core 9 is mounted to the outer periphery of the sleeve 1 as illustrated in FIG. 3B. The third embodiment is different from the second embodiment in only this point. The sleeve 1 is subjected to pore sealing treatment such as impregnation with resin before assembly with the stator core 9 and, further, dynamic pressure generating grooves are formed on the bearing hole 1a, like the first embodiment.

With this configuration, the pore sealing treatment and the dynamic pressure generating groove forming process in the sleeve 1 as well as the process for winding the wire 13 around the stator core 9 can be simultaneously carried out in parallel.

Fourth Embodiment

Figure 4A:
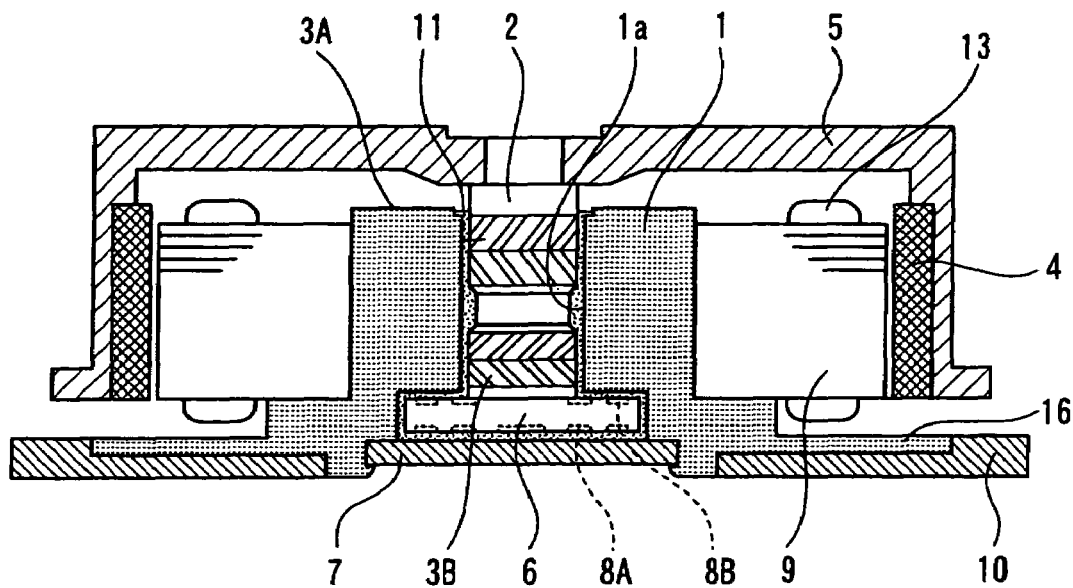
FIG. 4A is a sectional view of a spindle motor according to a fourth embodiment of the present invention.
Figure 4B:
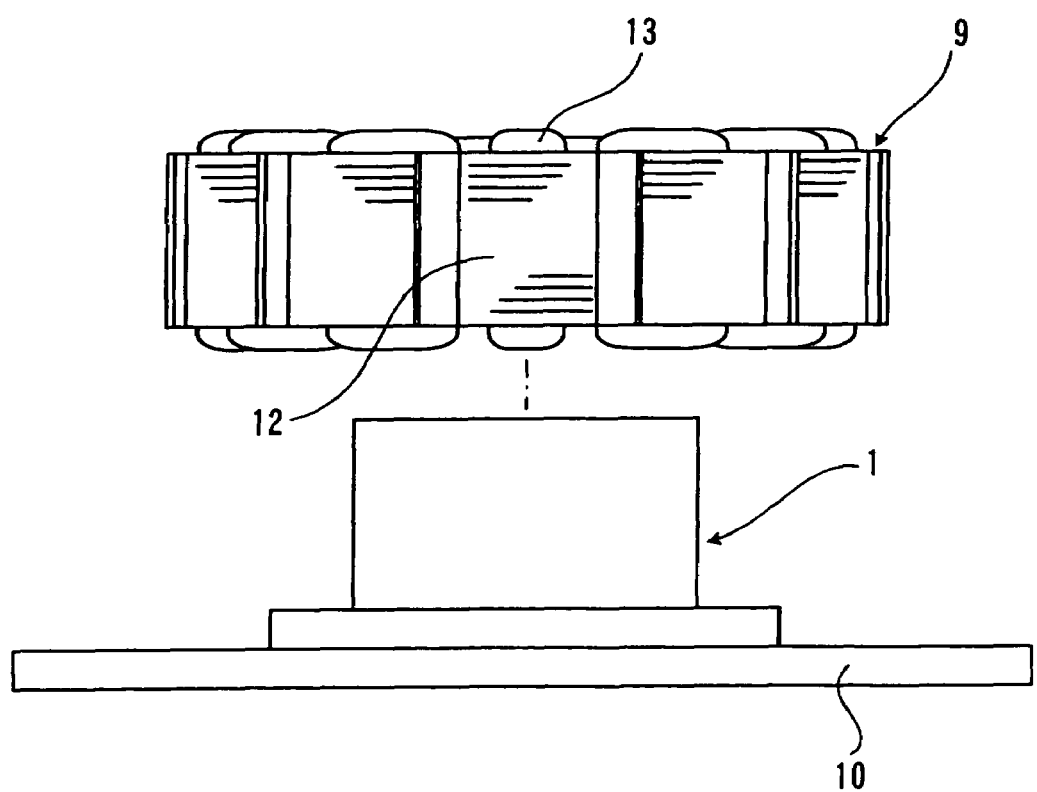
FIG. 4B is an assembly view of a main portion of the spindle motor.

FIGS. 4A and 4B illustrate a fourth embodiment of the present invention.

In the first embodiment illustrated in FIGS. 1A and 1B, the sleeve 1 is attached to the base 10, and the attraction part 16 is fixedly bonded to the base 10. In the fourth embodiment, as illustrated in FIG. 4A, the sleeve 1 and the attraction part extending to a portion in the vicinity of the magnet 4 are integrally formed with each other using sintered metal containing a ferromagnetic material. The fourth embodiment is different from the first embodiment in only this point.

According to this configuration, a process for attaching the attraction part 16, which is necessary in the first embodiment, can be eliminated. As illustrated in FIG. 4B, the wire 13 is wound around the stator core 9 and, then, the stator core 9 is mounted to the outer periphery of the sleeve 1. The base 10 is fixedly bonded to a portion in the vicinity of the attraction part 16 integrally formed with the sleeve 1.

Fifth Embodiment

Figure 5A:
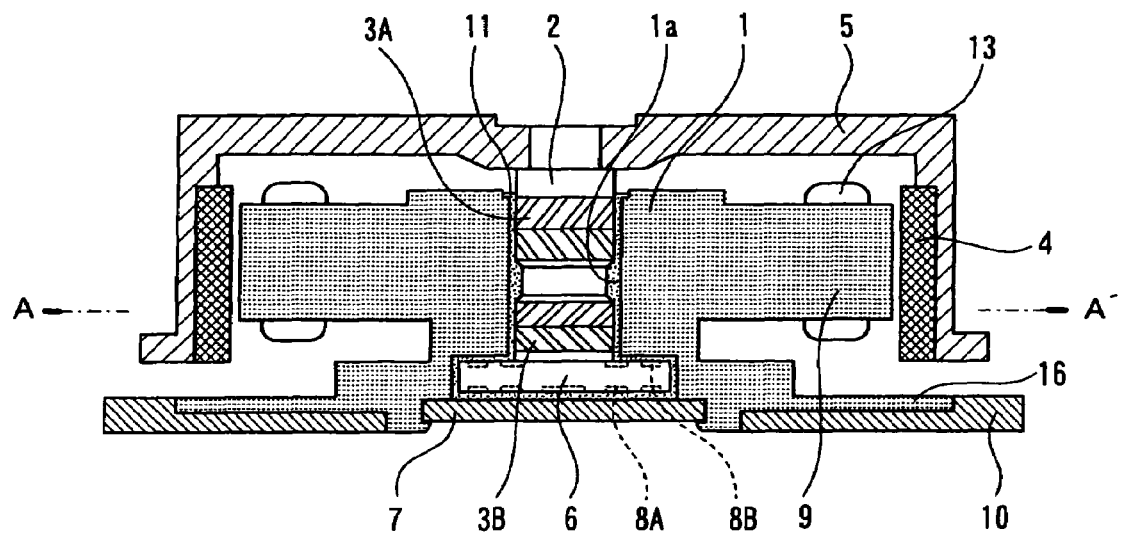
FIG. 5A is a sectional view of a spindle motor according to a fifth embodiment of the present invention.
Figure 5B:
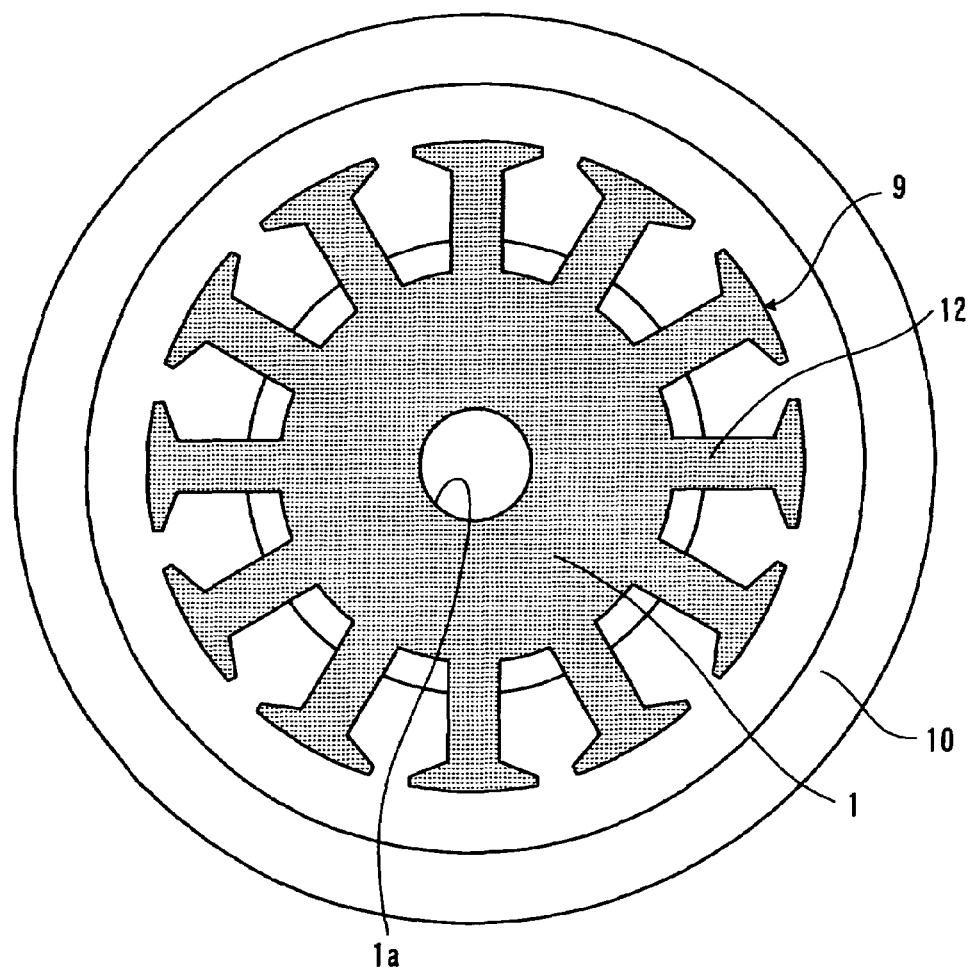
FIG. 5B is a sectional view of a main portion of the spindle motor, taken along line A-A' of FIG. 5A.

FIGS. 5A and 5B illustrate a fifth embodiment of the present invention.

In the fourth embodiment illustrated in FIGS. 4A and 4B, the stator core 9 is formed by laminating magnetic steel plates. In the fifth embodiment, as illustrated in FIGS. 5A, the sleeve 1, the attraction part 16, and the teeth 12 corresponding to the stator core 9 are integrally formed with one another using sintered metal containing a ferromagnetic material. The fifth embodiment is different from the fourth embodiment in only this point.

According to this configuration, a process for attaching the attraction part 16, which is necessary in the first embodiment, can be eliminated. Further, a process for assembling the stator core 9 and the sleeve 1 can be also eliminated.

Sixth Embodiment

Figure 6A:
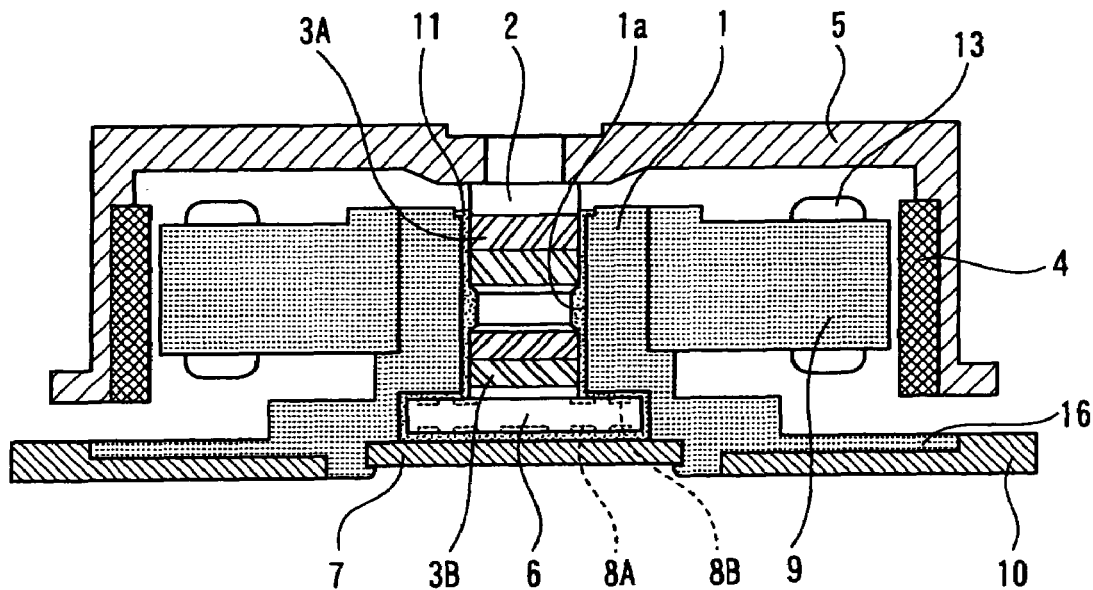
FIG. 6A is a sectional view of a spindle motor according to a sixth embodiment of the present invention.
Figure 6B:
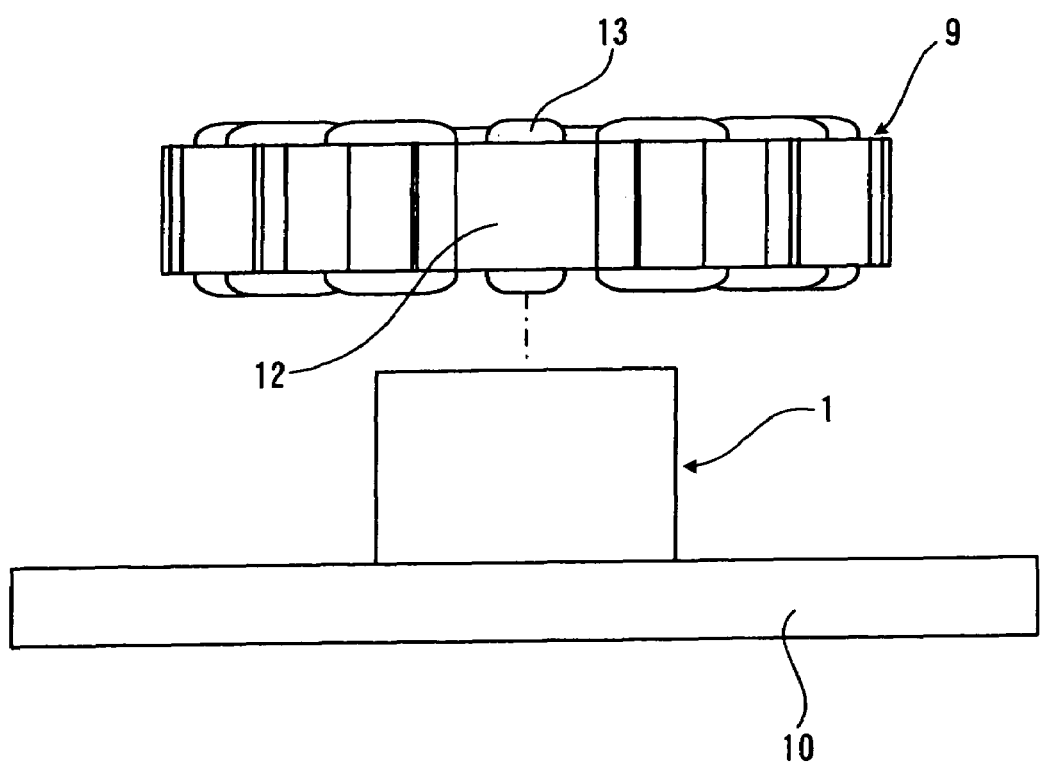
FIG. 6B is an assembly view of a main portion of the spindle motor.
Figure 7:
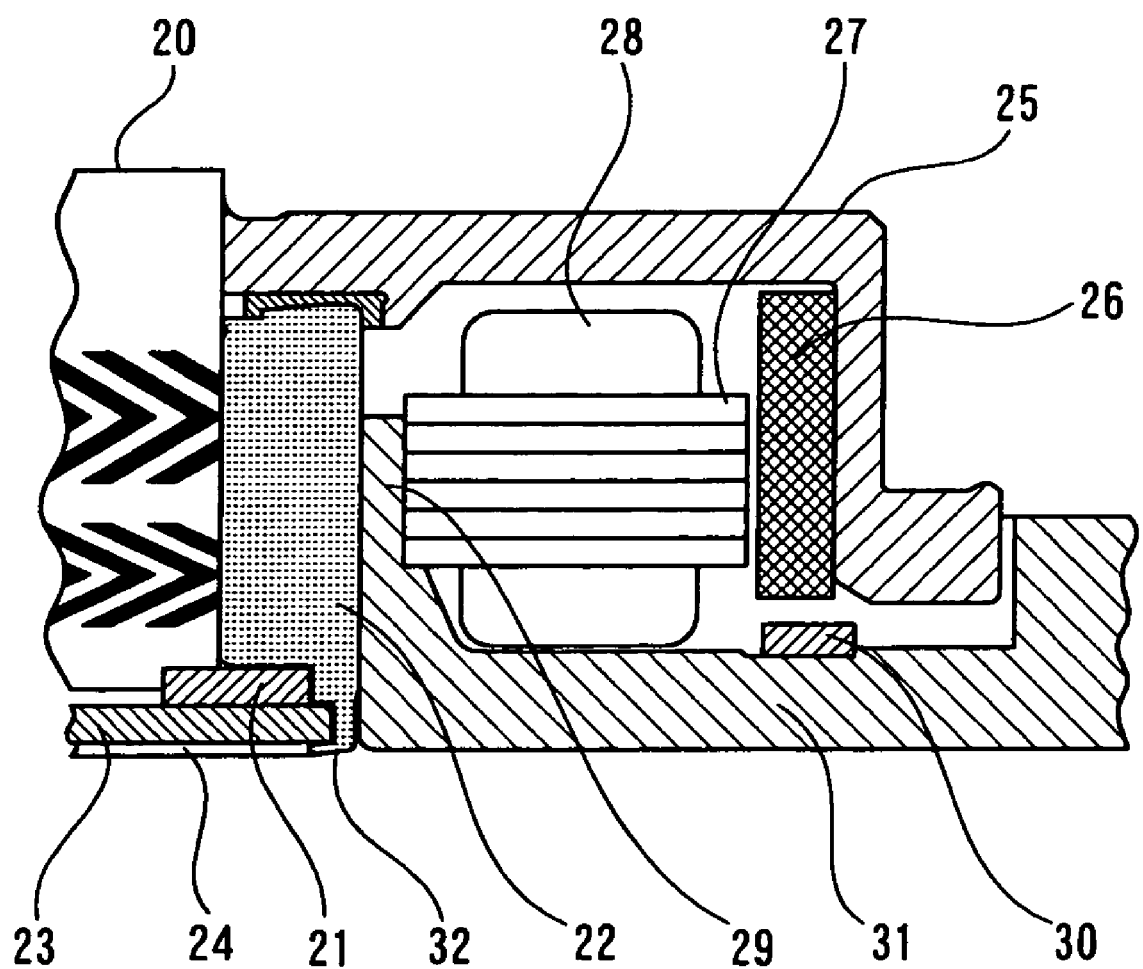
FIG. 7 is a sectional view of a conventional spindle motor.

FIGS. 6A and 6B illustrate a sixth embodiment of the present invention.

In the fifth embodiment illustrated in FIGS. 5A and 5B, the sleeve 1, the attraction part 16, and the teeth 12 corresponding to the stator core 9 are integrally formed with one another using sintered metal containing a ferromagnetic material. In the sixth embodiment, as illustrated in FIGS. 6A, the sleeve 1 and the attraction part 16 are integrally formed with each other using sintered metal containing a ferromagnetic material; however, the stator core 9 is separated from the sleeve 1 and is made of sintered metal containing a ferromagnetic material. The sixth embodiment is different from the fifth embodiment in only this point. Like the first embodiment, the sleeve 1 is subjected to pore sealing treatment such as impregnation with resin prior to assembly with the stator core 9 and, further, dynamic pressure generating grooves are formed on the bearing hole 1a and the like.

According to this configuration, the wire 13 is wound around the stator core 9 made of sintered metal containing a ferromagnetic material and, then, the stator core 9 can be mounted to the outer periphery of the sleeve 1, as illustrated in FIG. 6B. Thus, the pore sealing treatment and the dynamic pressure generating groove forming process in the sleeve 1 as well as the process for winding the wire 13 around the stator core 9 can be simultaneously carried out in parallel.

In the aforementioned embodiments, description is given of the base 10 made of a non-magnetic aluminum die-cast material or the like. However, the first to third embodiments are effective even when the base member is formed by a presswork and the like using an iron-based material or the like which is a magnetic material. In this case, since the base member functions as an attraction part, the attraction part 16 can be eliminated.

In the aforementioned embodiments, when the ferromagnetic material contained in the sintered metal includes at least one of iron, nickel, cobalt, and an alloy thereof, the similar effects can be expected.

In the aforementioned embodiments, when the supporting part of the rotation support shaft made of the sintered metal is subjected to pore sealing treatment of impregnation with resin in at least a portion with which operating fluid may be brought into contact, the similar effects can be expected.

In the aforementioned embodiments, when the supporting part of the rotation support shaft made of the sintered metal is subjected to pore sealing treatment of impregnation with resin and, further, plating treatment in at least a portion with which operating fluid may be brought into contact, the similar effects can be expected.

In the aforementioned embodiments, examples of the operating fluid may include, in addition to oil, grease with high fluidity, and ionic liquid.

The present invention can contribute to suppression of generation of vibration and noise caused by down sizing of a spindle motor, to reduction of the number of assembling processes and cost by reduction of the number of components, and to achievement of downsizing and cost reduction of AV products, home electric products and the like each of which uses a spindle motor for rotationally driving a recording medium.

What is claimed is:

1. A spindle motor comprising:
a stator comprising a stator core having teeth;
a wire wound around the teeth of the stator core; and
a rotor comprising: a rotation support shaft, a rotor hub and a magnet,
the rotor capable of being rotationally driven by a rotational magnetic field created when a current is applied to the wire,
wherein the stator core comprises a laminated plurality of magnetic steel plates mounted to an outer periphery of a supporting part of the rotation support shaft of the rotor,
the supporting part of the rotation support shaft comprises sintered metal containing a ferromagnetic material, and can be passed through a magnetic flux of the rotational magnetic field,
a hydrodynamic bearing comprising an operating fluid filled between the rotation support shaft and the supporting part, and
at least a portion of the supporting part of the rotation support shaft which comes into contact with the operating fluid is pore-sealed treated.

2. The spindle motor according to claim 1, wherein the ferromagnetic material comprises at least one of iron, nickel, cobalt, and an alloy thereof.

3. The spindle motor according to claim 1, wherein the portion of the supporting part of the rotation support shaft is impregnated with a pore-sealing resin.

4. The spindle motor according to claim 3, wherein the portion of the supporting part of the rotation support shaft is further plated.

5. The spindle motor according to claim 1, comprising a shoulder on a lower part of the outer periphery of the supporting part, and the stator core is mounted on the shoulder of the supporting part.

* * * * *